United States Patent [19]

Drinkuth et al.

[11] Patent Number: 4,501,095
[45] Date of Patent: Feb. 26, 1985

[54] METHOD AND APPARATUS FOR GRINDING TURBINE ENGINE ROTOR ASSEMBLIES USING DYNAMIC OPTICAL MEASUREMENT SYSTEM

[75] Inventors: William H. Drinkuth, Amston; Robert J. Bires, Glastonbury; Robert J. Miller, Vernon; Franklin G. Selleck, Portland, all of Conn.

[73] Assignee: United Technologies Corporation, Hartford, Conn.

[21] Appl. No.: 501,982

[22] Filed: Jun. 7, 1983

[51] Int. Cl.³ ............................................. B24B 49/12
[52] U.S. Cl. ............................... 51/165.72; 51/105 R; 51/289 R; 29/156.8 R; 73/432 L
[58] Field of Search ............ 51/289 R, 105 R, 165.72; 29/404, 156.8; 73/432 L

[56] References Cited

U.S. PATENT DOCUMENTS

| | | | |
|---|---|---|---|
| 2,795,900 | 6/1957 | Modler | 51/289 R |
| 3,673,897 | 7/1972 | Gassner | 51/289 R |
| 3,835,591 | 9/1974 | Cimprich | 51/165.72 |
| 3,848,369 | 11/1974 | Monajjem | 51/165.72 |
| 4,370,834 | 2/1983 | Habib | 51/165.72 |

FOREIGN PATENT DOCUMENTS 2700713  7/1978  Fed. Rep. of Germany ... 51/165.72

Primary Examiner—Harold D. Whitehead
Attorney, Agent, or Firm—C. G. Nessler

[57] ABSTRACT

A rotor assembly comprised of a multiplicity of blades mounted around the periphery of a disk has the blade tips ground to great diametrical precision when the assembly is rotated at a high speed in excess of 1000 rpm in a special grinding process. Individual blade lengths are dynamically measured while the assembly is being ground. These measurements are used to control the grinding process and to also permit accurate assessment of the quality of assemblies in general. A laser triangulation measurement system is used. It is capable of very fast reading of blade length since 3300 or more blades may pass by the measuring point each second.

12 Claims, 7 Drawing Figures

METHOD AND APPARATUS FOR GRINDING TURBINE ENGINE ROTOR ASSEMBLIES USING DYNAMIC OPTICAL MEASUREMENT SYSTEM

TECHNICAL FIELD

The present invention involves metalworking, specifically the process and machinery for grinding turbomachine rotor assemblies, and most especially grinding them during overhaul.

BACKGROUND

Most aircraft gas turbine engines, as well as axial flow turbomachines used in many other applications, have within them disks or rotors which carry a multiplicity of removable blades. Such structures are used in both the compressor and the turbine parts of the engine to respectively compress and expand the working fluid. In some instances the rotating blades have shrouds at their outermost tips and are connected at these locations. More commonly, modern engines have blades that lack shrouds and are only supported at their roots in the rotor disk.

For high efficiency, it is desired to have the closest possible fit between the tips of the rotating blades and the sealing structure of the circumscribing case of the originally manufactured engine. During use, especially during the maneuvers which aircraft accomplish, there is occasionally rubbing between the blades and the circumscribing abradable sealing ring. In addition, other degradation of the blades occurs as an inevitable result of long hours of use. As a result, the clearances between the blade tips and the case are increased and it is an object of engine overhaul to restore these clearances.

To achieve good fits the rotor blades must be precisely ground to within ±0.025 mm so that they are all at a constant radial distance from the center line of the engine. This presents a substantial machining problem, both in original part manufacture and in overhaul.

While the tolerances sought currently are tighter than previously, there has always been a desire to have bladed rotors fit well. Primarily this has been achieved by separately machining the rotors and blades to close tolerances but this has resulted in an accumulation of tolerances greater than now is acceptable. Consequently, it is preferred to machine blades while they are a part of a disk and blade assembly. Of course, because the blades are removable they necessarily fit somewhat loosely in the rotor disk. Thus, during machining shims have been placed under the blades to thrust them radially outward to approximately the position they assume during use. Low speed workpiece rotation, common in cylindrical grinding, also tends to have the same effect, but in neither case is the seating comparable to that obtained during high speed engine rotation. Typically, horizontal rotary grinding machines have been used to grind the assemblies while they rotate at no more than a few hundred revolutions per minute.

However, the forces accompanying slow rotation or from use of shims are not powerful. It has been found that the older tip grinding processes produce a variation in length at individual blades which is too great, much more than ±0.025 mm on a 0.25–0.30 m diameter rotor assembly. Additionally, there is a particular rotor construction wherein the slot which receives the multiplicity of blades runs circumferentially around the rim of the disk. With this configuration, it is not practical to insert shims. Thus, during machining either the blades and their retention slot have been configured to limit radial inward movement or resilient cushions have been used to sandwich the rotor and thus capture the blades during machining. Neither of these approaches is entirely satisfactory in producing the desired accuracy.

A further problem in machining rotors involves the means for measuring the diameter of a machined rotor assembly. The diameter of the bladed rotor or fixture has traditionally been measured with the conventional gaging associated with machine shops, including in recent times the use of scanning laser micrometers. Generally, measurements are ordinarily taken when the part is not rotating although the speed of reading of various non-contact electro-optical measuring systems does permit measurements to be taken while the workpiece is rotating at a relatively low velocity of about 25 rpm. Individual blade dimensions measured under static or trivial rotational speeds will not be indicative of those in a rapidly rotating structure. There have been developed non-contact systems for measuring dimensions of high speed rotating machinery. For instance, U.S. Pat. No. 3,992,627 to Stewart discloses the use of x-rays to measure clearances in operating gas turbine engines. The technical publication co-authored by Drinkuth (one of the inventors herein) et al, "Laser Proximity Probes for the Measurement of Turbine Blade Tip Clearances" Instrumentation Society of America 20th Annual Instrumentation Symposium, May 21–23, 1974, discloses the use of a laser triangulation system to measure tip clearance in a gas turbine engine. In the Drinkuth et al system the reflected laser beam position is measured with a vidicon and cathode ray tube display. U.S. Pat. No. 4,074,104 to Fulkerson discloses a grinding method utilizing a triangulating laser beam for position measurement, where the beam is prefocused at a particular point representing the desired final dimension.

None of the foregoing measuring systems has provided anything more than an average reading of the dimensions of a rapidly rotating article. The spinning articles may have had variation in radial dimension around their circumference but the configurations of the prior systems could not output this information. Thus the dynamic readings for a bladed rotor were deficient in not revealing blade to blade variations which can cause leakage or excess wear of the circumscribing seal.

Also, if there are a number of short blades in the rotor assembly, machining to an average gage length will produce a greater than desired dimension in the longer blades. Thus there have been problems in both the actual maching procedures and the gaging procedures used in machining rotors, and the present invention is directed to their solution. The present application is related to the commonly assigned application of Miller, "Method for Cylindrical Grinding Turbine Engine Rotor Assemblies", Ser. No. 501,983, filed on even date herewith, the disclosure of which is incorporated by reference. The Miller application relates to grinding speeds and is referred to further below.

DISCLOSURE OF THE INVENTION

An object of the invention is to grind rotor assemblies to radial accuracies of the order of ±0.025 mm or better. A further object of the invention is to identify in a rotor assembly the extent to which particular blades are deviant from the average radius of the rotor.

According to the invention the tips of blades in a rotor assembly can be machined to very accurate radial dimensions by rotating the assembly faster than 1000 rpm with a blade tip velocity of greater than 25 m/s, at a speed sufficient to force the blades outwardly so that they fully seat in the disk and resist disruptive forces from the machining medium which is preferably a grinding wheel. While the material is progressively removed from the blade tips at a first circumferential location, continuous measurements are made of the individual blade lengths at a second circumferential location, preferably 135° away from the first. A laser triangulation system capable of very fast reading rates is used, sufficient to provide data on individual blade tip lengths which pass by the measuring location at intervals of less than 0.004 seconds. The individual blade data is used to control the action of the grinder.

In the preferred embodiment of the invention a photo diode detector signal is utilized to command a linear diode array camera to read the reflected laser beam spot when a blade is present. A digital processor system receives the camera output and calculates the centroid of the beam spot, to more accurately measure the length of the particular blade. Angular position information is also provided to the processor and correlated with the individual blade length readings to enable display of identifiable blade numbers and lengths. The laser measuring system is capable of reading as many as 5,000 blades per second, reflecting blade-to-blade interval times of less than 0.0002 seconds.

The invention has shown that grinding techniques used heretofore have not produced the accuracies which were thought to exist based on slower reading electro-optical and other measuring systems. It has been found that improper grinding techniques can result in a few blades which are substantially deviant from the average. Such blades, especially long blades, can be very deleterious to the performance of gas turbine rotors. Now, the grinding techniques can be adjusted to provide better results. A most significant change, reflected in the apparatus and method of the invention, is grinding at a sufficiently high speed of assembly rotation.

The foregoing and other objects, features and advantages of the present invention will become more apparent from the following description of preferred embodiments and accompanying drawings.

BRIEF DESCRIPTION OF THE DRAWINGS

FIG. 6 shows a rotor which has been ground to a desired close tolerance while FIG. 7 shows a rotor that has a few blades which are excessively long.

BEST MODE FOR CARRYING OUT THE INVENTION

The invention is described in terms of the grinding of a one stage of a high pressure compressor rotor assembly for a Model PW2037 gas turbine engine made by Pratt & Whitney Aircraft, East Hartford, Conn. The invention will be also useful for the finishing of other gas turbine engine parts where the blades are removably contained in a disk.

The high pressure compressor rotor assembly for the aforementioned PW2037 engine is comprised of a multiplicity of different axial flow stages attached to each other. These stages have slightly different outside diameters and they are finish ground to such diameters in sequence. The invention herein is described in terms of machining of one of these stages, which for simplicity is referred to as a rotor assembly. A rotor assembly is comprised of a disk having a circumferential slot in which are contained 50–75 titanium alloy compressor blades. Alpha beta titanium alloys such as Ti-6Al-4V, Ti-8Al-1V-1Mo, Ti-6Al-2Sn-4Zr-2Mo and Ti-6Al-2Sn-4Zr-6Mo are common in rotor blades. Iron and nickel base alloys are used also.

Figure 1:
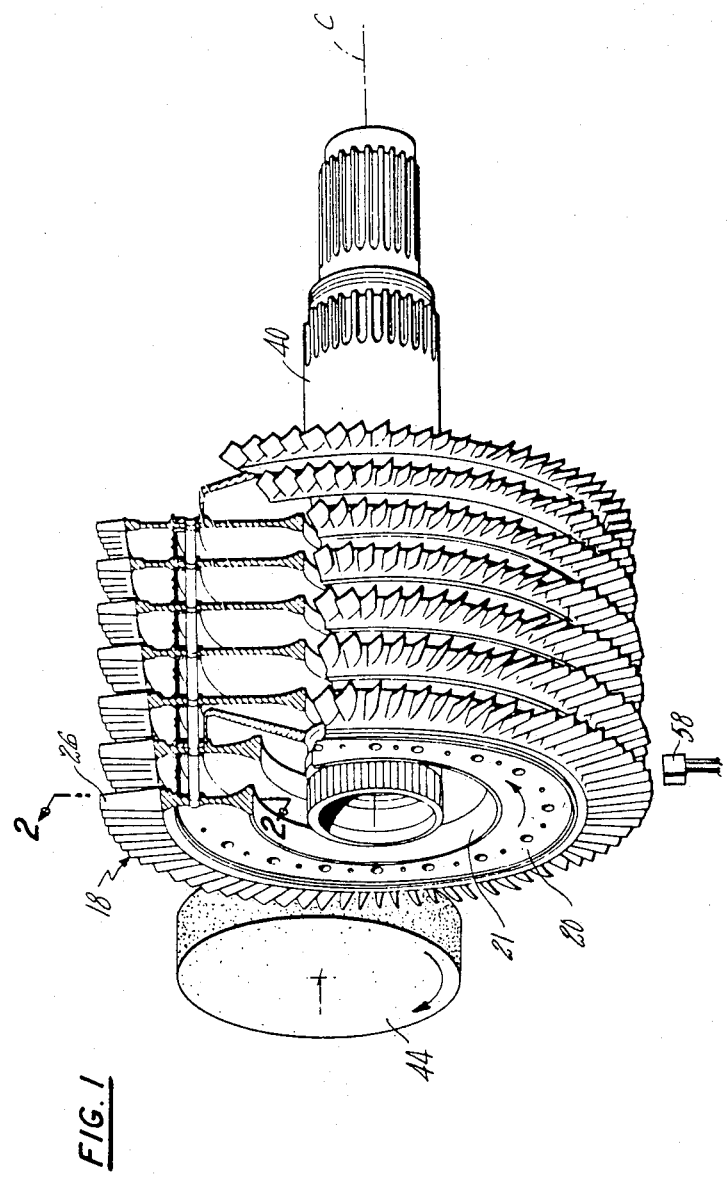
FIG. 1 shows a multi-stage gas turbine rotor as it is positioned for grinding.
Figure 2:
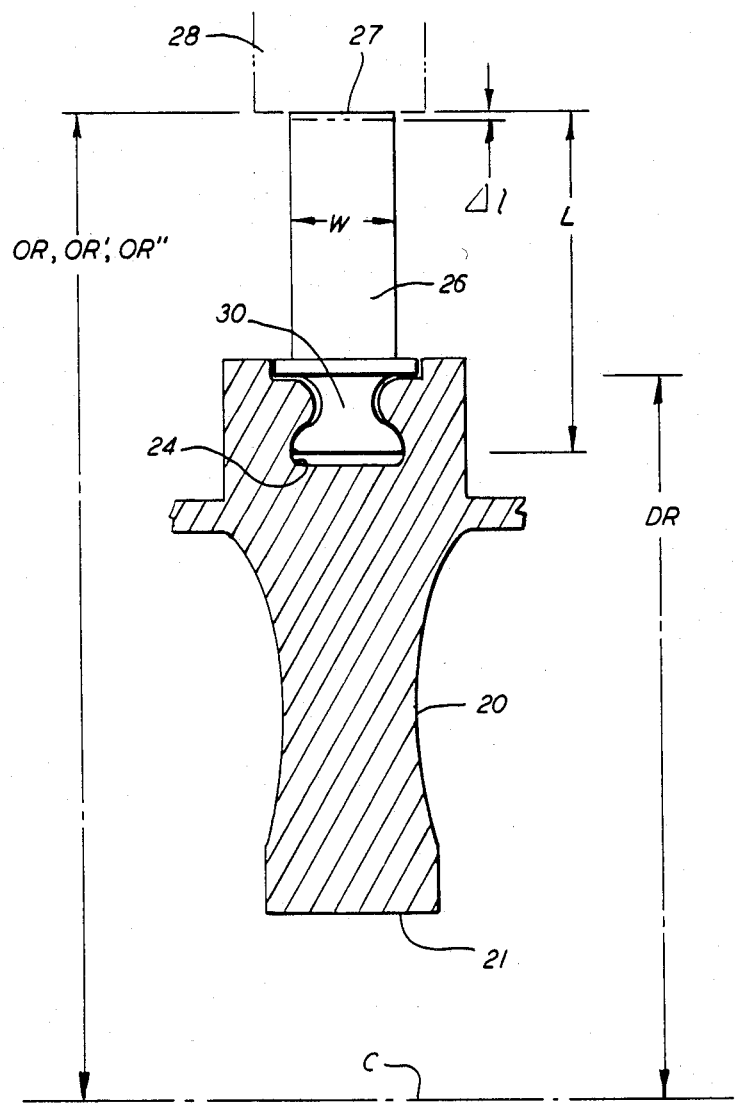
FIG. 2 shows a cross-section through one stage of the rotor in FIG. 1, illustrating how blades are mounted around the periphery of a disk to form a rotor assembly.

FIG. 1 shows in fragment how a rotor assembly 18 is ground and will be referred to again. FIG. 2 shows a cross section through the diametrical plane of the rotor assembly including a disk 20 having an outside radius DR and a bore 21 with a longitudinal centerline axis C. A circumferential slot 24 runs around the periphery of the disk and contained therein is a multiplicity of blades 26, one of which is shown in FIG. 2. The blade has a length L of about 64 mm. At its tip it has a chord length W of about 33 mm and a thickness of about 2.5 mm. In the Figure, the blade 26 is shown as it contacts the circumscribing airseal 28 (shown in phantom) which lines the interior of the engine case. In similar fashion it contacts the grinding wheel 44 in the practice of the invention.

In this description of the invention, it is desired that the blade length L be reduced by an amount $\Delta l$ so that the multiplicity of tips 27 of blade 26 in the rotor will give to the assembly a specified static radius OR. (The radius OR is directly related by calculation to the radius achieved in engine operation, when there is elastic and thermal expansion. For the PW2037 engine OR is about 0.28–0.36 m.) The blades are usually ground at a conical angle with respect to axis C by appropriately shaping the grinding wheel. Thus the representation of a single radius OR will be understood as a simplification. Typically, the rotor will have a rotational speed of about 8–12,000 rpm under normal operating conditions. Under such conditions, the root 30 of each blade is forced very tightly against the restraining slot 24 and there is considerable stress and resultant radial strain in the blade.

Figure 3:
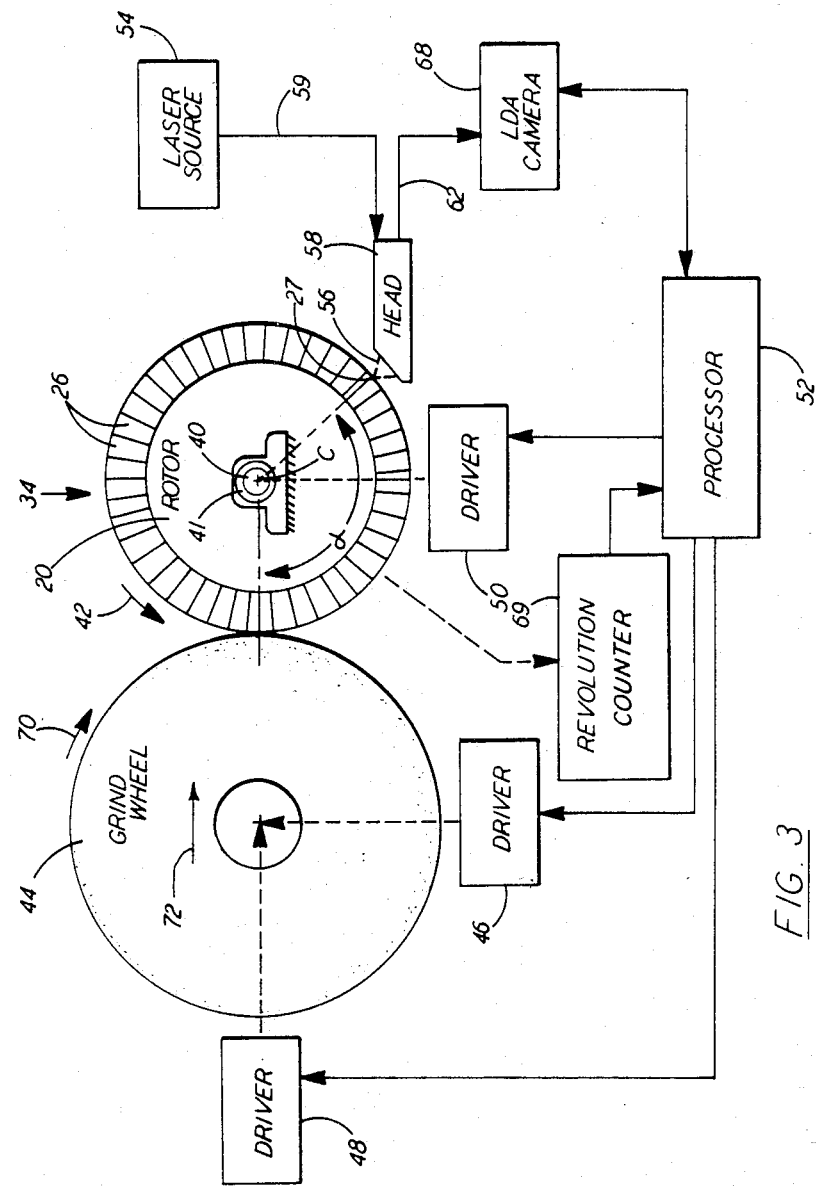
FIG. 3 is a semi-schematic end view of the rotor assembly grinding apparatus of the invention.

The essential aspects of the apparatus used in the practice of the invention are shown in FIGS. 1 and 3. The rotor assembly 34, comprised of a disk 20 and a plurality of blades 26, is mounted rotatably on a shaft 40 similar to the ordinary manner in which a circular workpiece is mounted in a horizontal spindle centertype cylindrical grinding machine. Sometimes the shaft is integral with the assembly. High precision bearings having low radial clearance and being similar to those used on rotor balancing machines should be used to support the shaft. Vibration is monitored during initial spinning of the rotor and if present it is eliminated. The shaft 40, and therefore the rotor assembly 34, is rotated by an electric motor driver 50 in the direction of normal engine rotation of the rotor assembly, as indicated by the arrow 42. A grinding wheel 44 rotates and translates to and from the rotor within the same plane as the plane of the disk. (Translation parallel to the axis C is optional, depending on the exact particulars by which the conical angle is achieved.) These motions are controlled respectively by the drivers 46, 48. All drivers are controlled by the processor 52.

Figure 4:
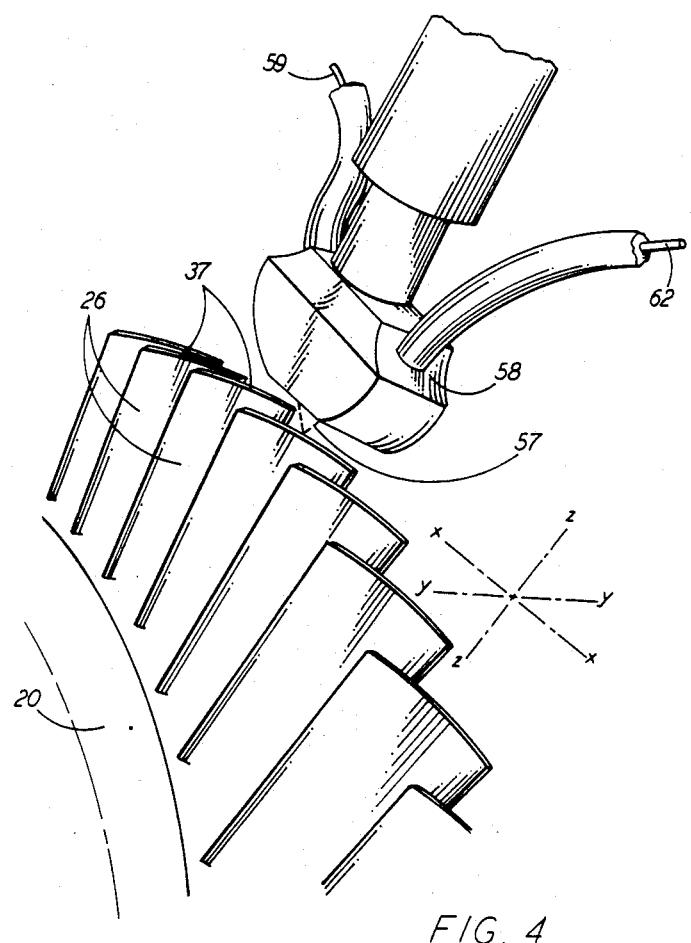
FIG. 4 is a perspective view showing how a laser beam is impinged on the tips of passing blades by means of a head assembly.

A laser gaging system is used to measure the radial position of each individual blade tip (and thus the blade length) during the grinding procedure. This system is described in more detail below, but with reference to FIGS. 3 and 4, in summary it is comprised of a head 58 which causes a laser beam 56 to impinge on the passing blade tips 27. The reflected beam position is measured by camera 68 and converted into a blade length signal for the processor 52. The motion of the drivers 46, 48, 50 is accordingly controlled to achieve the desired blade length. The laser measuring head 58 is properly positioned radially using conventional machine shop techniques, prior to placement of the rotor in its bearing mounting assembly. The circumferential location of the laser beam's point of impingement on the blade tips is important. It must be sufficiently removed circumferentially (in the direction of rotation) from the point of grinding, to allow restoration of locational stability to the blades after possible deflection during grinding and to avoid impingement by grinding sparks and dust 71. It must be located at least 45° from the point of grinding, and preferably is located between 135°–270°.

The driver 48 is actuated to translate (infeed) the grinding wheel 44 in the direction of arrow 72 toward the centerline of rotation of the rotor assembly until a desired dimension dynamic radius OR' is achieved. About 0.4–0.8 mm of material typically will be removed from blade tips in the process. To accomplish this in the most efficient manner possible, a stepped infeed rate is used. The grinding wheel is infed at a first high speed of about 0.0013 mm/s followed by a progressive slowing down to a final infeed rate of about 0.0002–0.0004 mm/s up to a stop position, where there is usually dwell to enable sparking out.

In the preferred practice of the invention, the PW2037 rotor assembly is rotated at a speed of 2000 rpm. This produces a centripetal acceleration on each blade of about 11,100 m/sec$^2$ (about 1130 g where g is acceleration gravity). This corresponds with a tangential tip velocity of about 60 m/s. Since this tip velocity is in excess of the known range which is feasible for machining titanium alloy without unacceptable burning, cracking, or residual stress, the grinding wheel 44 is counter-rotated in a direction 70 as shown in the Figures, so that it rotates in a direction opposite that of the assembly. This means that at the point of contact the abrasive surface is moving in the same direction as the blade tip. The peripheral speed of the wheel is set so that the relative grinding velocity is in the range of 20–40 m/s. A typical vitreous bond alumina wheel is used, such as a 0.76 m diameter 90–100 grit, L-0 hardness wheel. Coolant is not used to avoid disruption of the laser gage and to avoid the necessity of cumbersome containment shielding. Of course other abrasives, such as abrasive belts may be used. And in the general practice of the invention other types of tools which remove material from the passing tips may be used, including single point tools. Non-contact methods such as those using electrical energy and energy beams may also be contemplated.

Early work in rotor grinding, where the rotor is rotated at a few hundred r.p.m. and where the centripetal acceleration on the blade is of the order of 100 times the force of gravity have only made rotors which are accurate to a radial tolerance of no better than ±0.075 mm. Now, experiments using the equipment described herein have shown that there are certain parameters which are critical to obtaining better tolerances, of the order of ±0.025 mm radial tolerance. With reference to compressor rotors, and as described in more detail in the related Miller application, the rotor first should rotate in the direction which causes air to impinge on the blades in the same manner as gases do during use. Generally, this means rotating in the direction of the concave side of the airfoil, except when the aerodynamic forces will be trivial, as they may be with certain turbine rotors. Second, the rotor should rotate at a speed sufficient to produce in the blades a centripetal acceleration of 700 g (6,870 m/s$^2$), where g represents the force of gravity. Preferably the rotational speed is such that it produces a radial acceleration of about 1100 g (10,800 m/s$^2$). At slower speeds high accuracies are not achieved, evidently due to improper initial seating or unsustained seating of the blades during grinding. For example, a PW2037 rotor of 0.28 m radius OR will be rotated at 1700 r.p.m. or higher. Larger rotors of 0.38 m radius will be rotated at 1400 r.p.m. or higher.

At the high rotational speeds necessary to obtain good dimensional results, the tangential velocity of the blade tips exceeds that at which it is possible to grind blade tips dry without burning or other defects. Thus, it is necessary to move the abrasive surface in the same direction as the tangential velocity direction, to lower the relative velocity. With a grinding wheel this is accomplished by counterrotating the wheel relative to the rotor assembly. As an example, the PW2037 titanium alloy rotor at 2000 r.p.m. yields a tangential velocity of about 60 m/s. Burning occurs at such a grinding speed and thus the wheel is counter-rotated to make the relative velocity 20–40 m/s.

The high rotational speeds also mean that the time interval between passage by a point of adjacent blades is very short, at less than about 0.004 sec. For example, a 100 blade PW2037 rotor of 0.28 m radius rotating at a minimum good speed of 1700 r.p.m. will have a blade tip velocity of about 50 m/s and a blade-to-blade interval time of about 0.00035 seconds. If the rotor had 50 blades, the time would be double at 0.0007 seconds. A similar style rotor of 0.30 m radius at a preferred 2000 r.p.m. will have a tip velocity of about 63 m/s, and the time interval will be of the order of 0.0006 seconds for a 50 blade rotor and of the order of 0.0003 seconds for a 100 blade rotor. The reading rate for the laser gage must be greater than the blade passing rate; i.e., the gage reading time must be less than the blade-to-blade time interval to provide individual blade measurements.

In summary, larger gas turbine engines and similar axial flow turbomachinery parts have 50–100 or more blades in a rotor assembly. For such larger rotors the grinding speeds are in the range of 1000–2000 r.p.m. For small rotors, the speeds will be substantially higher. Such speeds produce high tangential tip velocities in the range 25–72 m/s and interval times of 0.0012 seconds or less. However, there are other parts which will be machined using the apparatus of the present invention, even though the acceleration criterion may not be met.

For example, a gas turbine fan typically has a radius OR of 1 m. Owing to the adaptation of fans to efficiently move air at low speeds, to run them at 1000-2000 r.p.m. would require undue amounts of power. Instead, fans will be rotated at about 500 r.p.m. In such situations, the tip velocity will be about 52 m/s and the interval time will be of the order of 0.004 seconds for a typical 30 blade fan.

Figure 5:
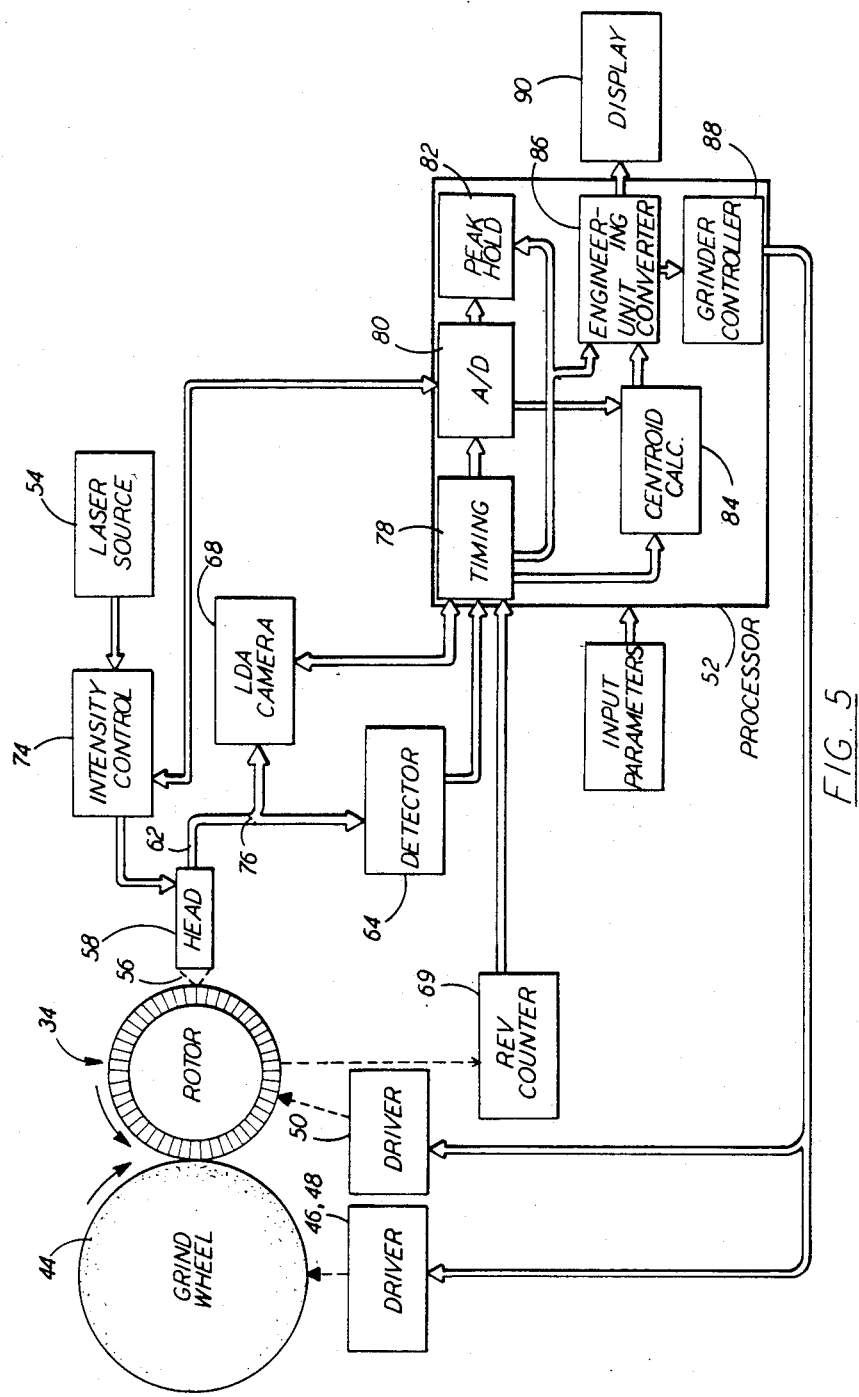
FIG. 5 is a schematic representation similar to FIG. 3 but showing more detail.

Previously, the only gaging system useful on rotor grinding machines were those which had sampling times of the order of 0.016 seconds or greater. Thus, given the high tangential velocities needed to produce accurate rotors, the older systems were ineffective in producing more than the average dimension of a number of blades in the rotor, or providing only the reading at a slower speed where grinding cannot be accurately done. It is now appreciated that it is essential to obtain more accurate data about the blade radii during the grinding process. This enables more accurate grinding and the making of decisions on remedial actions. The invention embodies a suitable system, having a reading rate which is better than the time interval of blade passage. FIG. 5 schematically illustrates the elements of the gaging portion of the apparatus. A laser source 54 such as a Hughes 5 mw helium neon laser delivers a beam, through an intensity controller 74, to a head 58 which obliquely impinges a focused laser beam 56 on the tips 27 of the passing blades 26 of the rotor assembly 34. Impingement normal to the blade tips may be used as well. The reflected beam spot is received by the head, focused and conveyed by optical fiber bundle 62 to a beam splitter 76; a portion of the beam is imaged onto a silicon photo diode detector 64 and another portion of the beam is imaged onto a linear diode array camera 68, such as a Fairchild CCD 1100 camera (Fairchild Camera Co., Mountain View, Calif.). If sparks are a problem, a suitable filter is used. A clean nitrogen gas purge is used to keep dust and debris away from the head. The camera and detector are connected to provide signals to the processor 52. Additionally, a revolution counter 69 provides an angular position signal for each revolution of the spinning rotor assembly. Drivers 46, 48, 50 for the rotational motions of the rotor and grind wheel and the linear motion of the wheel are connected to the processor. The processor is comprised of a timing section 78, an analog to digital converter section 80, a peak hold section 82, a centroid calculation section 84, an engineering unit converter 86 and a grinder controller 88. The processor also outputs to a display 90. The apparatus operates as follows. The beam 56 impinges on a blade tip and the reflected light is received by the detector 64 and the camera 68. The rev counter provides an angular position signal based on the periodic rotation of the rotor assembly thus enabling the timing section to calculate which blade is being measured. A simple pickup is suitable to enable identification of a reference blade. Based on the detector signal, the timing section commands the camera 68 to sample the the light received and to deliver a signal about location and intensity of the light to the A/D section 80. Thus the detector acts as a trigger to detect the presence of a blade; the detector via the timing section provides a read command signal to the camera. The camera must have a suitably fast sampling and clearing rate, within the constraints of the aforementioned inter-blade time interval. The A/D section converts the camera information and sends it to the peak hold section 82 and the centroid calculation section 84. When commanded by the timing section, the peak hold section looks at the data stream signal received from the camera via the A/D section, holds a maximum value of the stream, compares the value to a preset range, and if there is a variance causes the intensity controller to raise or lower the light level delivered to the head, to eliminate the variance. Thus, the camera and other parts of the system are enabled to operate properly. The centroid calculator 84 is commanded by the timing section to process the converted light signal information from the A/D unit. For the light which falls on the linear diode array in the camera, the unit 84 computes the centroid C' according to the relation $$C' = (\Sigma I \cdot P)/\Sigma I$$

where I is the photo diode light intensity at a particular diode location and P is the particular diode location. This permits accurate, high resolution, determination of the position of a spot of light falling on the photo diode array. The centroid calculator accordingly delivers a blade length signal to the engineering unit converter 86 which with timing unit input, outputs a display 90 showing the outside radius dimension (or blade length) for each blade location and the average for all blades. Additionally, the converter 86 signals the grinder controller 88 which compares the data to preset limits and appropriately commands the drivers 46, 50 and especially the linear driver 48, to cause the mechanical elements of the system to continue or stop the grinding action. Ordinary elements of the system including those which enable control of the grinding rate according to the amount of remaining material on the blades are not shown because the manner of effecting such control is within the ordinary skill.

The apparatus is configured to provide real-time data; i.e. the reflected light signal is processed by unit 52 in less than the time interval between the passage of adjacent blades. The signal from a particular blade for a particular revolution is stored temporarily by the processor and the grinder controller does not act on the signal until the subsequent rotation of the rotor produces another signal which substantially replicates the first signal. This eliminates possible transient reading errors such as might be caused by sparks, dust, etc.

Preferably the blades are counted with respect to a reference point provided by the revolution counter 69 to permit their individual numeric identification. However, in the general mode of the invention the number of blades in the rotor can be input to the processor and repetitious counting can be used to provide blade lengths with a particular reference blade. In such a case the angular position signal referred to above would be provided by the counting of blade tip presence signals from the detector.

Figure 7:
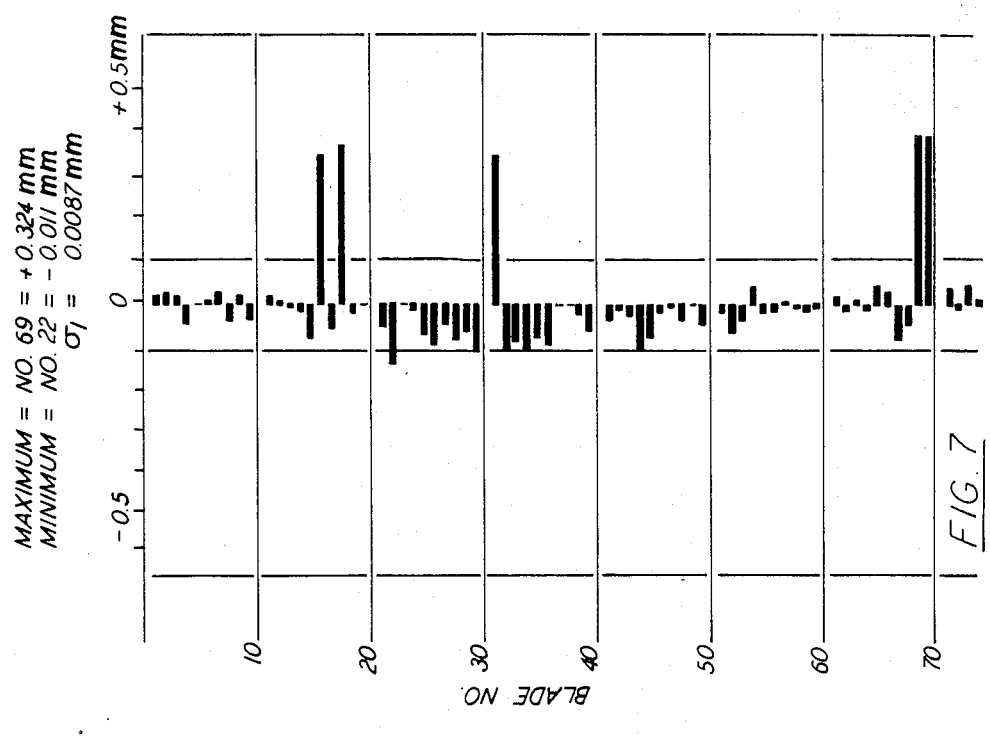
FIGS. 6 and 7 are graphical presentations of blade length data obtained in the use of the invention.
Figure 6:
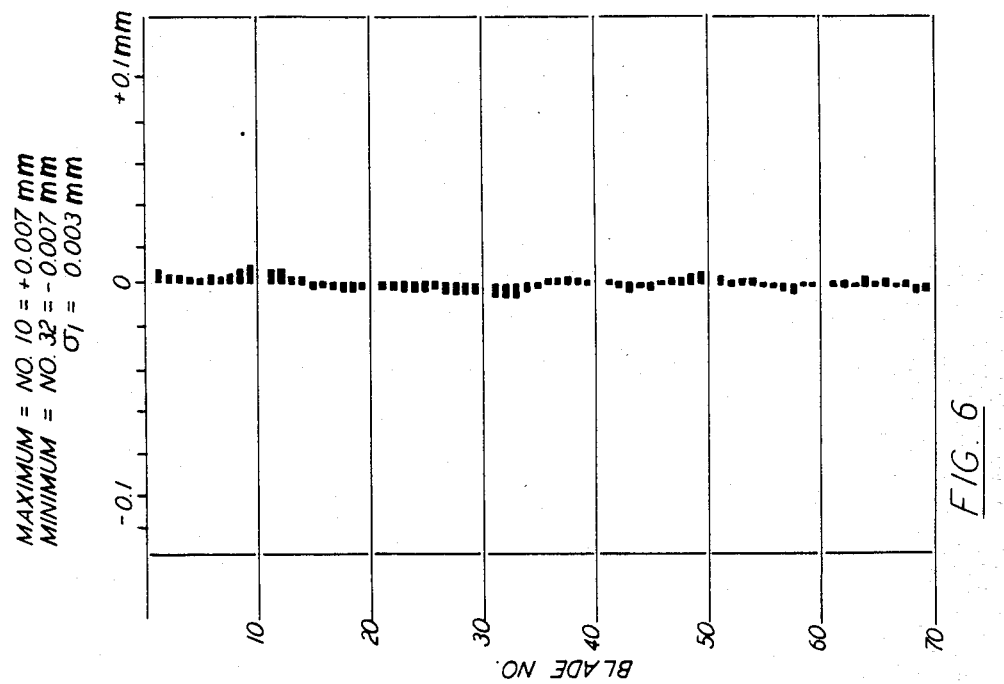

FIGS. 6 and 7 show typical blade length display data. FIG. 7 shows a rotor which is deviant in that it contains several excessively long blades. For such a rotor it will be appreciated how the older average value of length would be misleading. It would be thought that the rotor had reached its dimension whereas in fact were such a rotor used, the longer blades would immediately damage the circumscribing seal and produce excess clearance between the predominate (short) blades and the seal. Poor engine efficiency would result. In contrast FIG. 6 shows a rotor which has been accurately ground. The data show that the shortest blade is number 32, while the longest blade is number 10. Both are about an equal amount deviant from the average or baseline value, and the rotor is substantially within the desired accuracy of ±0.025 mm. See also the standard deviation value in the Figures. As indicated previously, prior art grinding techniques are now appreciated (through the use of the measuring invention) to have produced radial length variations of ±0.075 mm.

The invention now allows the selection during grinding of parameters which produce the desired high accuracies whereas previously there was no appreciation of the degree of problem which could result, except by observing the deleterious performance of the ground rotor assemblies. Rotor speeds and grinding feed rates can be set during the actual processing of a part.

The invention also permits remedial actions to be taken. For example, referring again to FIG. 7, it is evident that further grinding is indicated (at better parameters if the rotor has already been ground), to reduce the length of the few longer blades. Also, blade 22 is seen to be about 0.015 mm short. Suppose it was even shorter, substantially below the target OR dimension. There is no way to remedy this except by replacing the blade with one which is longer, and this action would be indicated.

In a more general sense, if a rotor assembly is comprised of both used (short) and new (long) blades, the invention may be used to identify a portion of the blades which are under the desired OR dimension. A criterion is set beforehand based on the summation of the number of blades and their respective shortness which is permitted in a rotor. This is reflective of the effective annular gap which the short blades will effectively produce as they sweep around the blade path, compared to the total annular gap which the entirety of all the blades sweeps. Grinding is undertaken and dynamic length measurements are taken for the rotor assembly. An average is calculated and the summation of short blades and lengths is compared to the summation criterion (which was based on the engineering judgment of permissible leakage in an engine). If the measured assembly fails to meet the criterion, then some of the short blades are replaced with longer blades. Another dynamic reading is taken and assessed against the criterion. If certain blades are now too long (which is probable), the grinding, reading and comparing are repeated. Thus, the invention allows efficient use of used components.

The apparatus of the invention is unusual in that the workpiece is spun at a very high speed compared to that known for grinding. The intermittent nature of the workpiece and looseness of the workpiece (at the blade attachment in the disk) means that the workpiece is unusual in that it can vary in dimension around the circumference even though the grinding machine is operated in a manner which would ordinarily grind a solid workpiece to a high diametrical accuracy. Accordingly, the apparatus will be useful in machining such other structures as are of analogous character to rotor assemblies of gas turbine engines.

Although this invention has been shown and described with respect to a preferred embodiment, it will be understood by those skilled in the art that various changes in form and detail thereof may be made without departing from the spirit and scope of the claimed invention.

We claim:

1. Apparatus from machining the tips of blades in a rotor assembly having removable spaced apart blades radially mounted around the periphery of a disk comprised of:
    (a) support means for holding a rotor assembly comprised of a disk and a plurality of removable blades along an axis of a machine base and for rotating the assembly thereabout in a first direction at a speed of at least 1000 rpm, to cause each spaced apart blade tip to move along a circumferential path with a tangential velocity of at least 25 m/s;
    (b) machining means for progressively removing material from the blade tips at a first circumferential path location while the blade tips are moving past the location with said velocity, to thereby change the length of the blades;
    (c) gaging means for measuring, at a second circumferential path location spaced apart from said first location, the radial position with respect to said axis of each of the individual blade tips as material is being removed from the rotating blade tips by the machining means and as blade tips pass by the second path location with an interval time of less than 0.004 seconds, the gaging means providing a blade length signal for each of the individual blade tips;
    (d) means for identifying each blade on the rotating assembly, the means providing an angular position signal; and
    (e) a processor responsive to the blade length signals and the angular position signal, for providing a blade length reading for each identified blade in the rotor assembly while it is being machined, and for controlling the rate at which material is removed from the tips by said machining means, to enable machining of the tips of the blades to a desired radial position.

2. The apparatus of claim 1 wherein the gaging means is an electro-optical system comprised of
    a source which provides a laser beam,
    means for impinging the beam on a passing blade tip and means for receiving a reflected beam spot signal, wherein the position of the reflected beam spot varies according to the radial position of the tip in space;
    detector means for detecting the presence of a reflected beam spot signal and for providing a read signal when a reflected beam spot signal is detected; and
    sensing means responsive to said read signal for receiving a portion of the reflected beam spot signal and for reading the reflected beam spot intensity and beam spot position, the time for reading being less than 0.004 seconds.

3. The apparatus of claim 2 wherein the processor includes means for computing the position of the centroid of the reflected beam spot of each passing blade tip and producing a length signal according to the location of the centroid.

4. The apparatus of claim 1 wherein the speed of rotating is at least 1700 rpm, wherein the tangential velocity is at least 50 m/s and wherein the blade interval time is less than 0.0007 seconds.

5. The apparatus of claim 1 wherein the means for removing material is an abrasive surface contacting the blade tips and wherein the abrasive surface moves in the same direction as the tangential velocity of each blade tip at the point of contact therebetween.

6. The apparatus of claim 5 wherein the second circumferential path location is located at least 45 degrees of rotation away from the first circumferential path location.

7. The method of finishing to a desired outside radius the tips of blades of a rotor assembly having a plurality of removable blades radially mounted around the periphery of a disk which comprises:
(a) rotating a rotor assembly about an axis thereof in a first direction with a speed of at least 1000 rpm, the speed sufficient to move the tips along a circumferential path with a tangential velocity of at least 25 m/s, and to cause the blade tips to pass by a first circumferential path location with an interval time of less than 0.004 seconds;
(b) removing material from the blade tips at a first circumferential path location while the assembly is rotating at said speed; and
(c) measuring the radial location of each of the individual blade tips with respect to the axis as each blade passes by a second circumferential path location, while the assembly is rotating at said speed, to produce a blade length measurement, by impinging on the blade tip a laser beam and measuring the position of the reflected spot thereof; and
(d) controlling with a processor the amount of material removed according to the blade length measurement obtained.

8. The method of claim 7 which further comprises adjusting the rotational speed of the rotor assembly based on the individual blade length measurements to provide a tangential velocity sufficient to produce in the assembly of blade tips radial locations which are less than ±0.075 mm from an average location.

9. The method of claim 7 which comprises identifying each blade with respect to its angular position on the rotor assembly and correlating each blade length measurement with each identified blade, and calculating an average blade length measurement, to show the extent to which each individual blade varies from the average.

10. The method of claim 7 which comprises calculating the position of the centroid of the reflected beam spot.

11. The method of claim 7 which comprises
setting a summation criterion based on the number of short blades in a rotor assembly and the amount by which each short blade is deficient, wherein a short blade is one which does not at its tip extend to the desired outside radius of the assembly;
grinding away a portion of the tips of a number of the blades and calculating an average radius of said ground tips, to make the average conform to the desired radius;
comparing the summation of blades and blade lengths shorter than said average to the summation criterion to determine whether the rotor assembly is acceptable or rejectable; and
removing at least one individual short blade from the rotor assembly and replacing it with a blade which is not short.

12. The method of claim 11 which further comprises repeating the grinding, measuring and comparing steps.

* * * * *